United States Patent [19]

Weber et al.

[11] Patent Number: 5,457,169

[45] Date of Patent: Oct. 10, 1995

[54] MOLDING MATERIALS BASED ON POLYARYLENE ETHERS HAVING TERMINAL ANHYDRIDE GROUPS

[75] Inventors: Martin Weber, Neustadt; Klaus Muehlbach, Gruenstadt; Wolfgang Eberle, Mainz, all of Germany

[73] Assignee: BASF Aktiengesellschaft, Ludwigshafen, Germany

[21] Appl. No.: 203,027

[22] Filed: Feb. 28, 1994

[30] Foreign Application Priority Data

Mar. 4, 1993 [DE] Germany .................. 43 06 708.5

[51] Int. Cl.$^6$ .......................... C08L 81/06; C08F 283/06
[52] U.S. Cl. .................. 525/534; 525/390; 525/397; 525/535; 525/537; 525/906
[58] Field of Search .................... 525/534, 535, 525/537, 906, 397, 390

[56] References Cited

U.S. PATENT DOCUMENTS

| | | | |
|---|---|---|---|
| 4,175,175 | 11/1979 | Johnson et al. | 525/534 |
| 4,296,217 | 10/1981 | Stuart-Webb | 525/397 |
| 4,600,741 | 7/1986 | Aycock et al. | 524/139 |
| 4,642,327 | 2/1987 | Matzner et al. | 525/434 |
| 4,642,358 | 2/1987 | Aycock et al. | 549/245 |
| 4,814,392 | 3/1989 | Shea et al. | 525/397 |
| 4,824,915 | 4/1989 | Aycock et al. | 525/397 |
| 5,069,818 | 12/1991 | Aycock et al. | 525/397 |
| 5,086,130 | 2/1992 | Dickinson et al. | 525/537 |
| 5,247,030 | 9/1993 | Kohler et al. | 525/537 |

FOREIGN PATENT DOCUMENTS

| | | |
|---|---|---|
| 004136 | 9/1979 | European Pat. Off. . |
| 106023 | 4/1984 | European Pat. Off. . |
| 320646 | 6/1989 | European Pat. Off. . |
| 4110460 | 10/1992 | Germany . |
| 4372624 | 12/1992 | Japan ............ 525/537 |

*Primary Examiner*—Thomas Hamilton, III
*Attorney, Agent, or Firm*—Keil & Weinkauf

[57] ABSTRACT

Molding materials are based on polyarylene ethers A having terminal anhydride groups and repeating units I

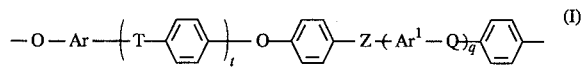

in which t and q may each be an integer 0, 1, 2 or 3, T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C=O, R$^a$ and R$^b$ are each hydrogen or C$_1$–C$_{10}$-alkyl, R$^c$ and R$^d$ are each hydrogen or a C$_1$–C$_{10}$-alkyl, C$_1$–C$_{10}$-alkoxy or C$_6$–C$_{18}$-aryl group, where the abovementioned groups may each be substituted by fluorine and/or chlorine and Ar and Ar$^1$ are each C$_6$–C$_{18}$-aryl which may have substituents selected from the group consisting of C$_1$–C$_{10}$-alkyl, C$_6$–C$_{18}$-aryl, C$_1$–C$_{10}$-alkoxy and halogen, or random copolymers or block copolymers thereof.

6 Claims, No Drawings

MOLDING MATERIALS BASED ON POLYARYLENE ETHERS HAVING TERMINAL ANHYDRIDE GROUPS

The present invention relates to molding materials based on polyarylene ethers A having terminal anhydride groups and repeating units I

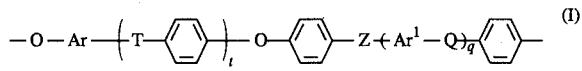

in which t and q may each be an integer 0, 1, 2 or 3, T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C=O, R$^a$ and R$^b$ are each hydrogen or C$_1$–C$_{10}$-alkyl, R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine and Ar and Ar$^1$ are each C$_6$–C$_{18}$-aryl which may have substituents selected from the group consisting of C$_1$–C$_{10}$-alkyl, C$_6$–C$_{18}$-aryl, C$_1$–C$_{10}$-alkoxy and halogen, or their random copolymers or block copolymers. The present invention furthermore relates to a process for the preparation of these molding materials and their use.

Molding materials based on polyarylene ethers having repeating structural units I are known per se. The known polyarylene ethers have terminal chlorine and/or hydroxyl groups. In general, these terminal groups are blocked (cf. for example EP-A2-106 023), for example by etherification of the hydroxyl group with halogen compounds in order, for example, to prevent undesirable reactions of the free hydroxyl groups at elevated temperatures.

In addition, molding materials which contain polyphenylene ethers having terminal anhydride groups are known (cf. U.S. 4. 600 741).

It is an object of the present invention to provide molding materials which are based on polyarylene ethers having repeating units I, have in particular good adhesive strength and can be used as heat-stable adhesives.

We have found that this object is achieved by the molding materials defined at the outset. Polyarylene ethers A The novel molding materials contain polyarylene ethers A having terminal anhydride groups and repeating units I

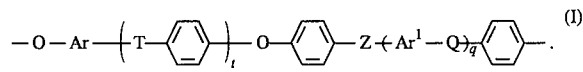

However, they may also contain a mixture of different polyarylene ethers A.

t and q may each be 0, 1, 2 or 3. T, Q and Z independently of one another may be identical or different. They may be a chemical bond or a group selected from —O—, —SO$_2$—, —S—, C=O, —N=N— and S=O. Furthermore, T, Q and Z may be a group of the general formula —R$^a$C=CR$^b$— or —CR$^c$R$^d$—, where R$^a$ and R$^b$ are each hydrogen or C$_1$–C$_{10}$-alkyl, R$^c$ and R$^d$ are each hydrogen, C$_1$–C$_{10}$-alkyl, such as methyl, ethyl, n-propyl, isopropyl, tert-butyl or n-hexyl, C$_1$–C$_{10}$-alkoxy, such as methoxy, ethoxy, n-propoxy, isopropoxy or n-butoxy, or C$_6$–C$_{18}$-aryl, such as phenyl or naphthyl. Polyarylene ethers A in which T, Q and Z are each —O—, —SO$_2$—, C=O, a chemical bond or a group of the formula —CR$^c$R$^d$— are preferred. The preferred radicals R$^c$ and R$^d$ include hydrogen and methyl. At least one of the groups T, Q and Z is —SO$_2$— or C=O. Ar and Ar$^1$ are each C$_6$–C$_{18}$-aryl, such as 1,5-naphthyl, 1,6-naphthyl, 2,7-naphthyl, 1,5-anthryl, 9,10-anthryl, 2,6-anthryl, 2,7-anthryl or biphenyl, in particular phenyl. These aryl groups are preferably unsubstituted. However, they may have substituents selected from the group consisting of C$_1$–C$_{10}$-alkyl, such as methyl, ethyl, n-propyl, isopropyl, tert-butyl and n-hexyl, C$_6$–C$_{18}$-aryl, such as phenyl and naphthyl, C$_1$–C$_{10}$-alkoxy, such as methoxy, ethoxy, n-propoxy, isopropoxy and n-butoxy and halogen. Preferred substituents from among these include methyl, phenyl, methoxy and chlorine.

Some suitable repeating units are shown below:

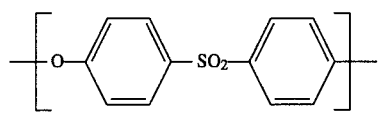

(I$_1$)

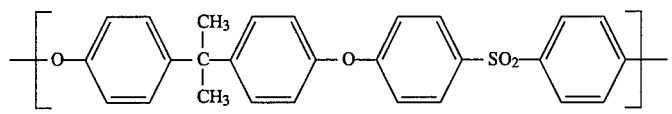

(I$_2$)

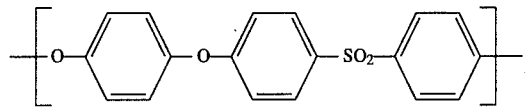

(I$_3$)

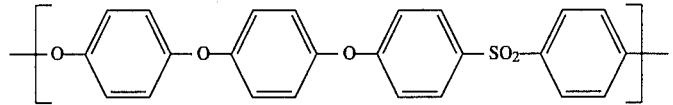

(I$_4$)

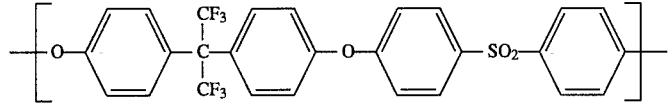

(I$_5$)

-continued
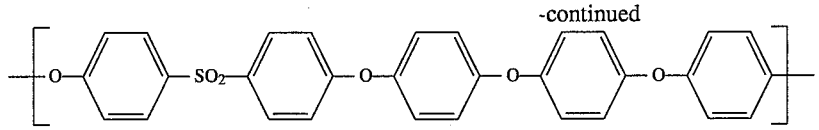 (I₆)
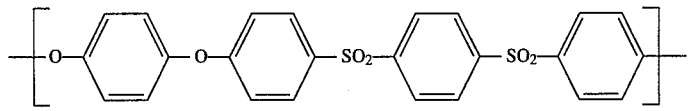 (I₇)
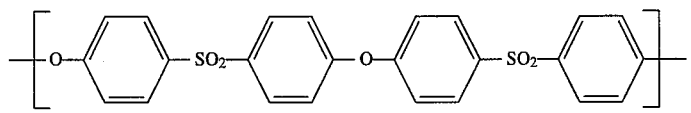 (I₈)
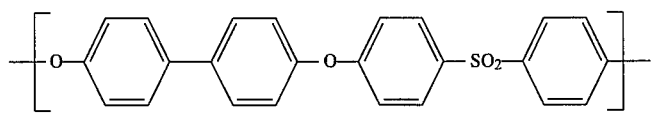 (I₉)
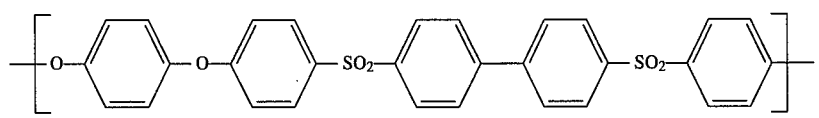 (I₁₀)
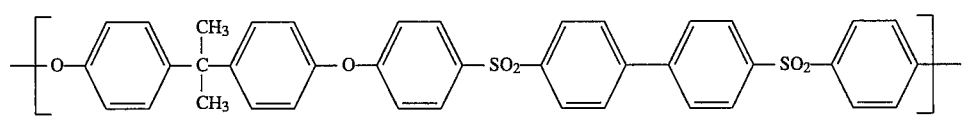 (I₁₁)
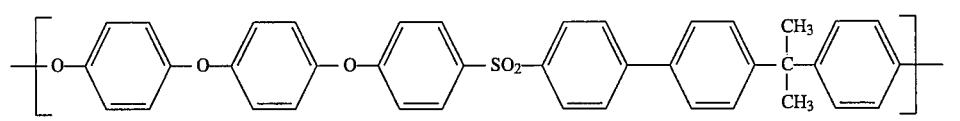 (I₁₂)
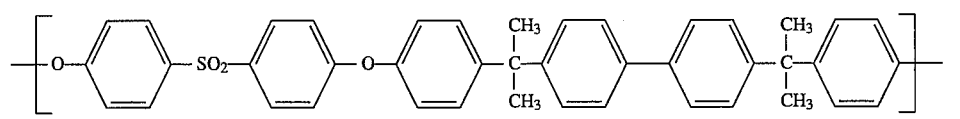 (I₁₃)
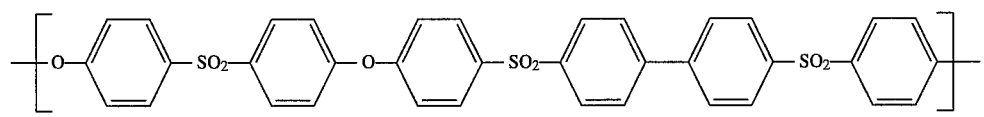 (I₁₄)
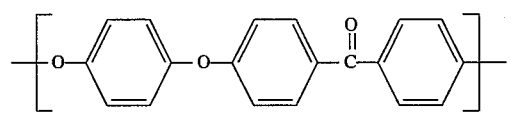 (I₁₅)
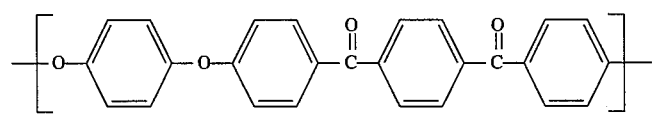 (I₁₆)
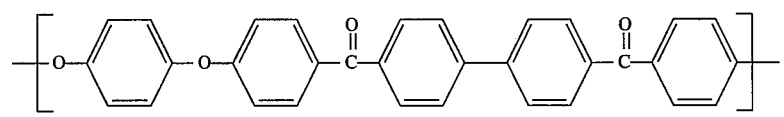 (I₁₇)
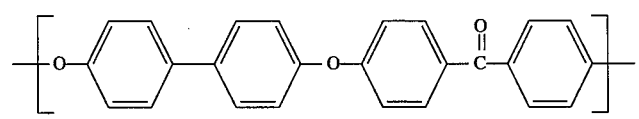 (I₁₈)
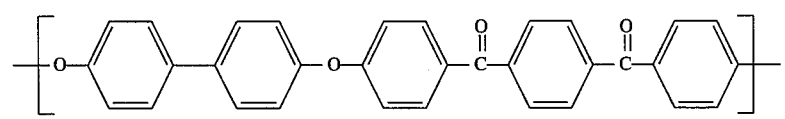 (I₁₉)

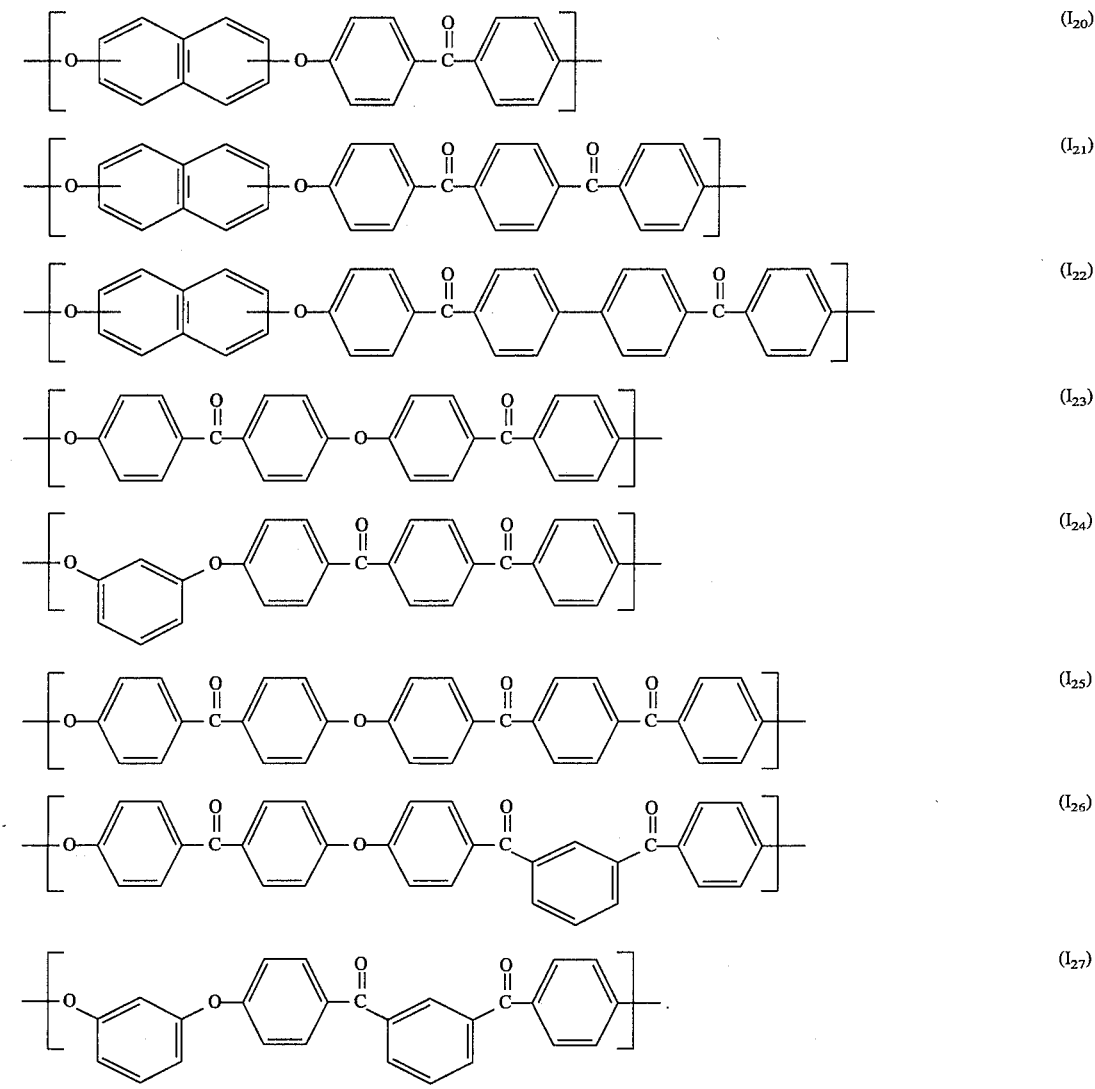

Very particularly preferred molding materials are those which contain, as component A, polyarylene ethers having repeating units ($I_1$), ($I_2$), ($I_{25}$) or ($I_{26}$). These include, for example, molding materials which contain, as component A, polyarylene ethers having from 5 to 95 mol % of repeating units ($I_1$) and from 5 to 95 mol % of repeating units ($I_2$).

The polyarylene ethers A may also be copolymers or block copolymers in which polyarylene ether segments and segments of other thermoplastic polymers, such as polyamides, polyesters, aromatic polycarbonates, polyestercarbonates, polysiloxanes, polyimides or polyetherimides, are present. The number average molecular weights of the blocks or of the grafts in the copolymers are as a rule from 1,000 to 30,000 g/mol. The blocks having different structures may be arranged alternately or randomly. The amount by weight of the polyarylene ethers in the copolymers or block copolymers is in general at least 10% by weight and may be up to 97% by weight. Preferred copolymers or block copolymers are those containing up to 90, particularly preferably from 20 to 80, % by weight of polyarylene ethers.

In general, the polyarylene ethers have number average molecular weights $M_n$ of from 15,000 to 60,000 g/mol and relative viscosities of from 0.25 to 0.95 dl/g. Depending on the solubility of the polyarylene ethers, the relative viscosities are measured in 1% strength by weight N-methylpyrrolidone solution, in a mixture of phenol and dichlorobenzene or in 96% strength sulfuric acid, in each case at 20° C. or 25° C.

According to the invention, the polyarylene ethers A contain terminal anhydride groups, among which terminal anhydride groups having the structure

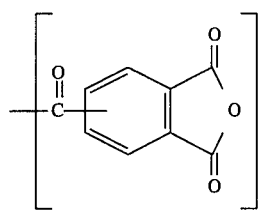

are preferred. These can preferably be prepared by reacting corresponding polyarylene ethers having terminal hydroxyl groups and repeating structural elements I with anhydrides of the general formula II

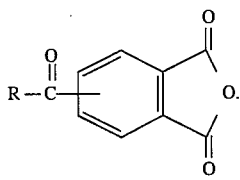

(II)

Here, R may be chlorine or bromine, preferably chlorine, but may furthermore be $C_1$–$C_{10}$-alkoxy, preferably n-$C_1$–$C_{10}$-alkoxy. Examples are methoxy, ethoxy, n-butoxy, isobutoxy and n-pentyloxy, among which n-butoxy is preferred. R may also be $C_6$–$C_{10}$-aryloxy, preferably phenoxy. The alkoxy or aryloxy groups may be unsubstituted or substituted. Suitable substituents are, for example, halogen, such as chlorine, bromine or in particular, fluorine.

Trimellitic anhydride chloride ($II_1$) and trimellitic anhydride n-butyl ester ($II_2$)

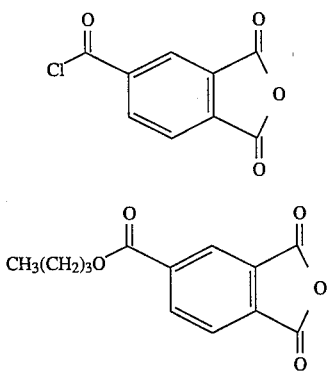

are particularly preferred anhydride components.

Polyarylene ethers A which are obtainable by reacting from 80 to 99.5% by weight of polyarylene ethers having terminal hydroxyl groups and repeating units I with from 0.5 to 20% by weight of an anhydride compound II are preferred.

Polyarylene ethers having repeating units I are known per se and can be prepared by known methods.

They are formed, for example, by condensing aromatic bishalogen compounds and the double salts of alkali metals with aromatic bisphenols. They can also be prepared, for example, by autocondensation of alkali metal salts of aromatic halophenols in the presence of a catalyst. DE-A-38 43 438 gives, for example, a detailed list of suitable monomers. Suitable processes are described, inter alia, in U.S. Pat. No. 3,441,538 and 4,108,837, DE-A1-27 38 962 and EP-A1-361. Polyarylene ethers which contain carbonyl functions are also obtainable by the electrophilic (Friedel-Crafts) polycondensation, as described, inter alia, in WO 84/03892. In the electrophilic polycondensation, for the formation of the carbonyl bridges, either diacyl chlorides or phosgene are reacted with aromatics which contain two hydrogen atoms which can be exchanged for electrophilic substituents, or an aromatic acyl chloride which contains both an acyl chloride group and a substitutable hydrogen atom is subjected to autopolycondensation.

Preferred process conditions for the synthesis of polyarylene ethers are described in, for example, EP-A-113 112 and 135 130. The reaction of the monomers in aprotic solvents, in particular N-methylpyrrolidone, in the presence of an anhydrous alkali metal carbonate, in particular potassium carbonate, is preferred. Reacting the monomers in the melt has also proven advantageous in many cases.

Polyarylene ethers having repeating units I and terminal hydroxyl groups can be prepared, for example, by a suitable choice of the molar ratio of dihydroxy to dichloro monomers (cf. for example J. E. McGrath et al.: Polym. Eng. Sci. 17 (1977), 647; H. -G. Elias "Makromoleküle", 4th Edition (1981), Hüthig & Wepf-Verlag, Basle, pages 490–493).

The polyarylene ethers which have repeating units I and contain from 0.02 to 2% by weight of terminal hydroxyl groups are preferably used. Those which have from 0.1 to 1.5% by weight of terminal hydroxyl groups are very particularly preferred.

The reaction of the hydroxyl-terminated polyarylene ethers with the anhydride compounds to give polyarylene ethers A takes place in general in a solvent. Examples of suitable organic solvents are chlorobenzene, tetrahydrofuran, dimethylformamide and N-methylpyrrolidone. In general, elevated temperatures are required for the reactions. As a rule, the reaction takes place only slowly at below 40° C. Temperatures of 6° C. or higher are generally required. The reactions take place in general at from 60° to 150° C. Temperatures higher than 160° C. are not generally required. The reaction is preferably carried out in the presence of an acid acceptor if the anhydride compound contains a hydrogen atom which can be eliminated, such as trimellitic anhydride chloride $II_1$. Trialkylamines in which the alkyl radicals may each be of 1 to 20 carbon atoms are, for example, suitable as acid acceptors. These include trimethylamine, triethylamine, triisobutylamine, triisooctylamine and cyclic amines. Triethylamine is particularly preferably used. If the reaction of the hydroxyl-terminated polyarylene ethers with the anhydride compound is a transesterification, for example the reaction with trimellitic anhydride n-butyl ester $II_2$, the reaction is preferably carried out in the presence of a transesterification catalyst. Suitable transesterification catalysts include the phosphites, titanates and organic tin compounds usually used for transesterifications, as well as antimony oxide. The duration of the reaction is in general not less than 20 minutes. The reaction is, as a rule, complete after from 3 to 4 hours. In general, the reaction time is from 30 to 240 minutes. The reaction product is preferably obtained by precipitation in a nonsolvent, for example a low molecular weight alcohol, such as methanol, ethanol, propanol or isopropanol, or water, or a mixture thereof. However, it is also possible to remove the reaction solvent from the reaction product, for example in a devolatilization extruder or a thin-film evaporator, and to isolate the reaction product in this manner.

In a further preferred embodiment, the hydroxylterminated polyarylene ethers can be reacted with the anhydride compound at from 270° to 370° C., particularly from 280° to 350° C., in the melt in a continuous or batchwise mixing unit (for example a single-screw or twinscrew extruder or a kneader). The anhydride compound, preferably in liquid form or dissolved in a high-boiling solvent, is, for example, metered into the melt of the hydroxyl-terminated polyarylene ether within the kneading zone of a mixing unit. A particularly suitable high-boiling solvent is dimethylformamide or N-methylpyrrolidone. Trimellitic anhydride esters are particularly suitable for reaction in the melt. Trimellitic anhydride n-butyl ester is very particularly preferably used.

The amount of anhydride groups in the polyarylene ether A can be determined by the known methods of general organic analysis, such as titration or IR, UV and NMR spectroscopy.

In addition to the polyarylene ethers A, the novel molding materials may also contain further components which are described in detail below.

In a preferred embodiment, the molding materials contain the components

A) from 5 to 99, in particular from 5 to 50, % by weight of polyarylene ether A, B) from 0 to 90, in particular from 15 to 80, % by weight of polyarylene ether B and C) from 1 to 45, in particular from 10 to 35, % by weight of fibrous or particulate reinforcing agents or fillers or mixtures thereof, the amounts of the components A to C summing to 100% by weight in each case.

In another preferred embodiment, the molding materials contain the components

A) from 1 to 99, in particular from 10 to 90, % by weight of polyarylene ether A, B) from 0 to 90, in particular from 5 to 80, % by weight of polyarylene ether B, C) from 0 to 45, in particular from 10 to 35, % by weight of fibrous or particulate reinforcing agents or fillers or mixtures thereof, D) from 1 to 99, in particular from 10 to 90, % by weight of thermoplastic polyamides D and E) from 0 to 25, in particular from 2 to 20, % by weight of rubber impact modifiers E, the amounts of components A to E summing to 100% by weight in each case.

Further novel molding materials which are preferred contain the components

A) from 10 to 88% by weight of polyarylene ether A,

B) from 0 to 80% by weight of polyarylene ether B,

D) from 10 to 88% by weight of thermoplastic polyamide D and

E) from 2 to 20% by weight of rubber impact modifiers E, the amount of the components summing to 100% by weight in each case.

Component B

In addition to the polyarylene ethers A, the novel molding materials may also contain polyarylene ethers B whose terminal groups differ from those of the polyarylene ether A and which contain repeating units III

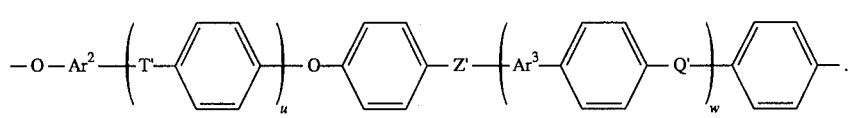

(III)

u and w have the same meanings as t and q and may be identical to, or different from, these. T', Q' and Z' have the same meanings as T, Q and Z and may be identical to, or different from, T, Q and Z. $Ar^2$ and $Ar^3$ may be identical to, or different from, Ar and $Ar^1$ and have the same meanings as Ar and $Ar^1$.

Copolymers containing polyarylene ether segments may also be used as component B.

The polyarylene ethers B may contain, for example, terminal halogen, methoxy, hydroxyl, phenoxy, benzyloxy or amino groups. Polyarylene ethers B having terminal halogen or methoxy groups are preferably used.

These polyarylene ethers B are, as stated above, known or are obtainable by known methods.

The polyarylene ethers B may be present in the novel molding materials in an amount of up to 90, preferably up to 80, % by weight.

Component C

In addition to the components A and B, the novel molding materials may also contain reinforcing agents and fillers. The novel molding materials may contain, as component C, for example up to 45, preferably from 10 to 35, % by weight of fibrous or particulate fillers or reinforcing agents or mixtures thereof.

Preferred fibrous fillers or reinforcing agents are carbon fibers, potassium titanate whiskers, aramid fibers and particularly preferably glass fibers. When glass fibers are used, they may be provided with a size and an adhesion promoter for better compatibility with the matrix material. In general, the carbon and glass fibers used have a diameter of from 6 to 20 μm.

The glass fibers may be incorporated both in the form of short glass fibers and in the form of rovings. In the finished injection molded part, the average length of the glass fibers is preferably from 0.08 to 0.5 mm.

Carbon or glass fibers may also be used in the form of woven fabrics or mats and glass fibers in the form of rovings.

Suitable particulate fillers are amorphous silica, asbestos, magnesium carbonate (chalk), powdered quartz, mica, talc, feldspar, glass spheres and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite.

Component D

In addition to the components A and C, the novel molding materials may also contain thermoplastic polyamides. The polyamides contained as component D in the materials are likewise known and comprise semicrystalline and amorphous resins which have a weight average molecular weight of at least 5,000 and are usually referred to as nylon. Such polyamides are described in, for example, U.S. Pat. Nos. 2,071,250, 2,071,251, 2,130,523, 2,130,948, 2,241,322, 2,312,966, 2,512,606 and 3,393,210.

The polyamides D can be prepared, for example, by condensation of equimolar amounts of a saturated or aromatic dicarboxylic acid of 4 to 12 carbon atoms with a saturated or aromatic diamine which has up to 14 carbon atoms, or by condensation of ω-aminocarboxylic acids or polyaddition of corresponding lactams.

Examples of such polyamides are polyhexamethyleneadipamide (nylon 66), polyhexamethyleneazelaamide (nylon 69), polyhexamethylenesebacamide (nylon 610), polyhexamethylenedodecanediamide (nylon 612), the polyamides obtained by ring cleavage of lactams, such as polycaprolactamand polylaurolactam, as well as poly-11-aminoundecanoic acid and a polyamide obtained from di-(p-aminocyclohexyl)-methane and dodecanedioic acid.

It is also possible to use polyamides which have been prepared by copolycondensation of two or more of the abovementioned polymers or their components, for example copolymers of adipic acid, isophthalic acid or terephthalic acid and hexamethylenediamine or copolymers of caprolactam, terephthalic acid and hexamethylenediamine. Such partly aromatic copolyamides contain from 40 to 90% by weight of units which are derived from terephthalic acid and hexamethylenediamine. A small amount of terephthalic acid, preferably not more than 10% by weight, based on the total amount of aromatic dicarboxylic acids used, may be replaced by isophthalic acid or other aromatic dicarboxylic acids, preferably those in which the carboxyl groups are in the para-position.

In addition to the units which are derived from terephthalic acid and hexamethylenediamine, the partly aromatic copolyamides contain units which are derived from ε-caprolactam and/or units which are derived from adipic acid and hexamethylenediamine.

The amount of units which are derived from ε-caprolactam is up to 50, preferably from 20 to 50, in particular from 25 to 40, % by weight while the amount of units which are derived from adipic acid and hexamethylenediamine is up to 60, preferably from 30 to 60, in particular from 35 to 55, % by weight.

The copolyamides may also contain both units of ε-caprolactam and units of adipic acid and hexamethylenediamine; in this case, it should be ensured that the amount of units which are free of aromatic groups is at least 10, preferably at least 20, % by weight. The ratio of the units which are derived from ε-caprolactam and from adipic acid and hexamethylenediamine is not subject to any particular restriction.

The polyamides having from 50 to 80, in particular from 60 to 75, % by weight of units which are derived from terephthalic acid and hexamethylenediamine and from 20 to 50, preferably from 25 to 40, % by weight of units which are derived from ε-caprolactam have proven particularly advantageous for many intended uses.

The preparation of the partly aromatic copolyamides can be carried out, for example, by the process described in EP-A-129 195 and EP 129 196.

Preferred partly aromatic polyamides are those which contain less than 0.5% by weight of triamine units, in particular units of dihexamethylenetriamine. Partly aromatic polyamides which contain 0.3% by weight or less of triamine are particularly preferred.

Linear polyamides having a melting point higher than 200° C. are preferred.

Preferred polaymides are polyhexamethyleneadipamide, polyhexamethylenesebacamide and polycaprolactam, as well as polyamide 6/6T and polyamide 66/6T. The polyamides generally have a relative viscosity of from 2.0 to 5, determined in a 1% strength by weight solution in 96% strength sulfuric acid at 23° C., which corresponds to a number average molecular weight of from 15,000 to 45,000. Polyamides having a relative viscosity of from 2.4 to 3.5, in particular from 2.5 to 3.4, are preferably used.

Other polyamides which may be mentioned are those which are obtainable, for example, by condensation of 1,4-diaminobutane with adipic acid at elevated temperatures (polyamide 4,6). Preparation processes for polyamides having this structure are described in, for example, EP-A 38 094, EP-A 38 582 and EP-A 39 524.

The amount of the polyamides D in the novel molding materials may be from 1 to 99, preferably from 10 to 90, in particular from 10 to 40, % by weight.

Component E

In addition to the components A to D, the novel molding materials may also contain up to 25, preferably from 2 to 20, % by weight of a rubber impact modifier E. Conventional impact modifiers which are suitable for polyamides and/or polyarylene ethers may be used.

Rubbers which increase the toughness of polyamides generally have two essential features: they contain an elastomeric fraction which has a glass transition temperature of less than −10° C., preferably less than −30° C., and at least one functional group which can interact with the polyamide. Examples of suitable functional groups are carboxyl, anhydride, ester, amide, imide, amino, hydroxyl, epoxide, urethane and oxazoline groups.

Examples of rubbers which increase the toughness of the blends are the following:

EP or EPDM rubbers which have been grafted with the abovementioned functional groups. Suitable graft reagents are, for example, maleic anhydride, itaconic acid, acrylic acid, glycidyl acrylate and glycidyl methacrylate.

These monomers may be grafted onto the polymer in the melt or in solution, in the presence or absence of a free radical initiator, such as cumyl hydroperoxide.

The copolymers of α-olefins may also be mentioned. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and vinyl esters, in particular vinyl acetate, have proven suitable comonomers. Mixtures of different comonomers may also be used. Copolymers of ethylene with ethyl or butyl acrylate and acrylic acid and/or maleic anhydride have proven particularly useful.

The copolymers may be prepared in a high pressure process at from 400 to 4,500 bar or by grafting the comonomers onto the poly-α-olefin. The α-olefin content of the copolymer is in general from 99.95 to 55% by weight.

A further group of suitable elastomers comprises core/shell graft rubbers. These are graft rubbers prepared in emulsion and consisting of at least one rigid and one flexible component. A rigid component is usually understood as being a polymer having a glass transition temperature of less than 25° C., while a flexible component is understood as being a polymer having a glass transition temperature of not more than 0° C. These products have a structure comprising a core and at least one shell, the structure being determined by the order of addition of the monomers. The flexible components are generally derived from butadiene, isoprene, alkyl acrylates or alkyl methacrylates and, if required, further comonomers. Suitable comonomers here are, for example, styrene, acrylonitrile and crosslinking or graft-linking monomers having more than one polymerizable double bond, such as diallyl phthalate, divinylbenzene, butanediol diacrylate or triallyl (iso)cyanurate. The rigid components are derived in general from styrene, α-methylstyrene or copolymers thereof, preferred comonomers here being acrylonitrile, methacrylonitrile and methyl methacrylate.

Preferred core/shell graft rubbers contain a flexible core and a rigid shell or a rigid core, a first flexible shell and at least one further rigid shell. The incorporation of functional groups, such as carbonyl, carboxyl, anhydride, amide, imide, ester, amino, hydroxyl, epoxy, oxazoline, urethane, urea, lactam or halobenzyl groups, is preferably effected here by the addition of suitably functionalized monomers during the polymerization of the final shell. Examples of suitable functionalized monomers are maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 20, preferably from 0.25 to 15, % by weight, based on the total Weight of the core/shell graft rubber. The weight ratio of flexible to rigid components is in general from 1:9 to 9:1, preferably from 3:7 to 8:2.

Such rubbers which increase the toughness of polyamides are known per se and are described in, for example, EP-A 208 187.

A further group of suitable impact modifiers comprises thermoplastic polyester elastomers. Polyester elastomers are understood as being segmented copolyetheresters which contain long-chain segment which are derived, as a rule, from poly(alkylene) ether glycols and short-chain segments which are derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Mixtures of different rubbers can of course also be used.

In addition to the components A to E described, the novel molding materials may also contain, for example, up to 40% by weight of further additives, such as flameproofing agents and stabilizers.

The novel molding materials can be prepared by conventional methods, for example extrusion.

If the novel thermoplastic molding materials contain further components in addition to the polyarylene ethers A, the molding materials can be prepared, for example, by mixing the starting components in a conventional mixing apparatus, such as a screw extruder, preferably a twin-screw extruder, a Brabender mill or a Banbury mill, or a kneader and then extruding the mixture. The extrudate is usually cooled after extrusion and comminuted.

The order in which the components are mixed may be varied; for example, two or, if required, three components may be premixed or all components may be mixed together.

In order to obtain a very homogeneous molding material, thorough mixing is advantageous. In general, average mixing times of from 0.2 to 30 minutes at from 280° to 380° C. are required for this purpose.

The novel molding materials based on the polyarylene ethers A possess high adhesive strengths and are therefore suitable as heat-stable adhesives. In addition, the filler-containing molding materials have very good toughness and strength. They are therefore also suitable, for example, for the production of moldings which are exposed to high mechanical loads or chemical influences.

EXAMPLES

In the Examples which follow, the amount of terminal trimellitic anhydride groups was determined by FT-IR spectroscopy. The viscosity number (VN) of the products was determined in 1% strength solution in N-methylpyrrolidone at 25° C. The concentration of terminal hydroxyl groups in component B was measured by potentiometric titration in dimethylformamide with methanolic KOH solution. Synthesis of polyarylene ethers A having terminal anhydride groups.

EXAMPLE 1

400 g of a polyarylene ether obtained from 4,4'-di-(4-hydroxyphenyl) sulfone and 4,4'-dichlorodiphenyl sulfone (VN=55 ml/g, 0.12% by weight of terminal OH groups) were dissolved in 1,200 ml of absolute N-methylpyrrolidone. The solution was then heated to 80° C. After the addition of 5.1 g of triethylamine, 10.5 g of trimellitic anhydride chloride, dissolved in 50 ml of tetrahydrofuran, were added over a period of 30 minutes. After the end of the addition, the reaction mixture was kept at 80° C. for a further 2 hours. The reaction product was isolated by precipitation in water.

The content of terminal trimellitic anhydride groups determined by FT-IR was 1.45% by weight. The viscosity number of the product was 55 ml/g.

EXAMPLE 1a 10 kg of the polyarylene ether sulfone from Example 1 and 180 g of trimellitic anhydride n-butyl ester and 1 g of $Sb_2O_3$ were mixed in a twin-screw extruder at a melt temperature of 330° C., the throughput being 10 kg/h.

The content of terminal trimellitic anhydride groups determined by FT-IR was 1.35% by weight. The viscosity number of the product obtained was 57 ml/g.

EXAMPLE 2

400 g of a polyarylene ether obtained from 4,4'-di-(4-hydroxyphenyl) sulfone and 4,4'-dichlorodiphenyl sulfone (VN=44 ml/g, 0.25% by weight of terminal OH groups) were dissolved in 1,200 ml of absolute N-methylpyrrolidone. The solution was then heated to 80° C. After the addition of 12.4 g of triethylamine, 25.8 g of trimellitic anhydride chloride, dissolved in 100 ml of tetrahydrofuran, were added over a period of 30 minutes. After the end of the addition, the reaction mixture was kept at 80° C. for a further 2 hours. The reaction product was isolated by precipitation in water.

The content of terminal trimellitic anhydride groups determined by FT-IR was 2.49% by weight. The viscosity number of the product was 45 ml/g.

EXAMPLE 3

.400 g of a polyarylene ether obtained from 2,2-di-(4-hydroxyphenyl)-propane (bisphenol A) and 4,4'-dichlorodiphenyl sulfone (VN=61 ml/g, 0.09% by weight of terminal OH groups) were dissolved in 1,200 ml of absolute N-methylpyrrolidone. The solution was then heated to 80° C. After the addition of 4.5 g of triethylamine, 9.3 g of trimellitic anhydride chloride, dissolved in 50 ml of tetrahydrofuran, were added over a period of 30 minutes. After the end of the addition, the reaction mixture was kept at 80° C. for a further 2 hours. The reaction product was isolated by precipitation in water.

The content of terminal trimellitic anhydride groups determined by FT-IR was 0.98% by weight. The viscosity number of the product was 60 ml/g.

EXAMPLE 4

400 g of a polyarylene ether obtained from 2,2-di-(4-hydroxyphenyl)-propane (bisphenol A) and 4,4'-dichlorodiphenyl sulfone (VN=42 ml/g, 0.28% by weight of terminal OH groups) were dissolved in 1,200 ml of absolute N-methylpyrrolidone and the solution was heated to 80° C. After the addition of 13.5 g of triethylamine, 28 g of trimellitic anhydride chloride, dissolved in 50 ml of tetrahydrofuran, were added over a period of 30 minutes. After the end of the addition, the reaction mixture was kept at 80° C. for a further 2 hours. The reaction product was isolated by precipitation in water.

The content of terminal trimellitic anhydride groups determined by FT-IR was 2.7% by weight. The viscosity number of the product was 42 ml/g.

Testing of performance characteristics .

The adhesive strength of the polyarylene ethers having terminal anhydride groups and prepared as described in Examples 1 to 5 was tested in the following test: 2 metal sheets were adhesively bonded with the molding material at from 300° to 350° C. (contact area 2× 2 cm); 0.6 g of polymer powder was used in each case for this purpose, and the sheets were all brought together under the same pressure. The force required to separate the sheets (adhesive strength) was determined in a tensile test at a strain rate of 0.1 cm/min.

The results of the tests are shown in the Table below. The comparative tests relate to the unchanged polymers having terminal hydroxyl groups.

TABLE 1

Molding materials as heat-stable adhesives

| Example | VN [ml/g] | % by weight of TMA* | Adhesive strength [N/mm²] |
|---|---|---|---|
| 1 | 55 | 1.45 | 4300 |
| V1 | 55 | — | 3400 |
| 1a | 57 | 1.35 | 4150 |
| 2 | 45 | 2.49 | 4650 |
| V2 | 44 | — | 3600 |
| 3 | 60 | 0.98 | 3900 |
| V3 | 61 | — | 3200 |
| 4 | 42 | 2.7 | 4400 |
| V4 | 42 | — | 3550 |

*TMA = Trimellitic anhydride
V1 to V4: Comparative Experiments

The polyarylene ethers having terminal anhydride groups have greatly increased adhesive strengths compared with those without anhydride groups. Glass fiber-reinforced novel molding materials EXAMPLES 5 to 10

Component $A_1$
For preparation, see Example 1a
Component $A_2$
For preparation, see Example 3
Component $B_1$
Polyarylene ether obtained from 4,4'-dihydroxydiphenyl sulfone and 4,4'-dichlorodiphenyl sulfone (VN=59 ml/g, measured in 1% strength solution in a 1:1 mixture of phenol and 1,2-dichlorobenzene; e.g. commercial product Ultrason® 2010, BASF). Component $B_2$
Polyarylene ether obtained from bisphenol A and 4,4'-dichlorodiphenyl sulfone (VN=64 ml/g, measured in 1% strength solution in a 1:1 mixture of phenol and 1,2-dichlorobenzene; e.g. commercial product Ultrason® S 2010, BASF).
Component C
Glass fiber rovings having a thickness of 10 μm, consisting of E glass and treated with a polyurethane size. After incorporation, the average lengths of the glass fibers were from about 0.1 to 0.5 mm.
Preparation of glass fiber-reinforced molding materials
The components A, B and C were mixed in a twinscrew extruder at a melt temperature of from 310° to 340° C. The melt was passed through a water bath and granulated.

The dried granules were processed at from 310° to 340° C. to give standard small bars (10×10×3 mm) and dumbbells.

The impact strength was determined using standard small bars according to DIN 52,453, and the moduli of elasticity and tensile strength were determined using dumbbells in the tensile test according to DIN 53,455.

The compositions of the molding materials and the results of the tests for the performance characteristics are shown in Table 2.

TABLE 2

Glass fiber-reinforced molding materials

| Component [% by weight] | Molding material No. | | | | | | | |
|---|---|---|---|---|---|---|---|---|
| | 5 | 6 | 7 | 8 | 9 | 10 | V5 | V6 |
| $A_1$ | 5 | 10 | 20 | — | — | — | — | — |
| $A_2$ | — | — | — | 5 | 10 | 20 | — | — |
| $B_1$ | 75 | 70 | 60 | — | — | — | 80 | — |
| $B_2$ | — | — | — | 75 | 70 | 60 | — | 80 |
| C | 20 | 20 | 20 | 20 | 20 | 20 | 20 | 20 |
| Impact strength [kJ/m²] | 28.1 | 30.2 | 33.4 | 27.0 | 29.4 | 32.1 | 24.3 | 25.1 |
| Modulus of elasticity [N/mm²] | 7700 | 7800 | 7750 | 7050 | 7100 | 7000 | 7650 | 7100 |
| Tensile strength [N/mm²] | 144 | 147 | 151 | 119 | 125 | 130 | 137 | 114 |

V5; V6: Comparative Experiments

The tests show that the novel glass fiber-reinforced molding materials have higher impact strengths and tensile strengths than glass fiber-reinforced molding materials based on polyarylene ethers which have no terminal anhydride groups, and the moduli of elasticity are of the same order of magnitude or higher. Polyamide-containing novel molding materials (Examples 11–20)

Component $D_1$
Polyhexamethyleneadipamide having a K value (according to Fikentscher) of 76, corresponding to a relative viscosity $\eta_{rel}$ of 2.95, measured in 1% strength by weight solution in 96% strength sulfuric acid.

Component $D_2$
Partly aromatic copolyamide, obtained by condensation of 55 parts by weight of terephthalic acid, 35 parts of ε-caprolactam and 38.5 parts of hexamethylenediamine, characterized by a relative viscosity of 2.4 (measured in 1% strength by weight solution in 96% strength sulfuric acid) and a triamine content of 0.27% by weight.

Component E
Ethylene/propylene rubber modified with 0.7% by weight of maleic acid/maleic anhydride and having an MFI value of 3 g per 10 min (measured at 2.16 kg/230° C.).

Preparation of the molding materials
The components were mixed in a twin-screw extruder at a melt temperature of 310° to 340° C. The melt was passed through a water bath and granulated.

The dried granules were injection molded at from 310° to 330° C. to give circular disks (60×2 mm) and standard small bars for determining the total penetration energy according to DIN 53,443 using circular disks or the notched impact strength according to DIN 53,453 using standard small bars.

The composition of the molding materials and the results of the measurements are shown in Tables 3 and 4.

TABLE 3

| Component [% by weight] | Polyamide-containing molding materials | | | | | | | |
|---|---|---|---|---|---|---|---|---|
| | Molding material No. | | | | | | | |
| | 11 | V7 | 12 | V8 | 13 | 14 | 15 | V9 |
| $A_1$ | 15 | — | 15 | — | 10 | 30 | 66 | — |
| $B_1$ | 69 | 84 | 51 | 66 | 56 | 36 | — | 66 |
| $D_1$ | 16 | 16 | — | — | — | — | — | — |
| $D_2$ | — | — | 34 | 34 | 28 | 28 | 28 | 28 |
| E | — | — | — | — | 6 | 6 | 6 | 6 |
| Total penetration energy [Nm] | 23 | 0.5 | 31 | 1 | 62 | 61 | 65 | 1 |
| Notched impact strength [kJ/m$^2$] | 2.9 | 1.0 | 3.0 | 1 | 3.4 | 6.9 | 13.4 | 1.2 |

TABLE 4

| Component [% by weight] | Polyamide-containing molding materials | | | | | | | |
|---|---|---|---|---|---|---|---|---|
| | Molding material No. | | | | | | | |
| | 16 | V10 | 17 | V11 | 18 | 19 | 20 | V12 |
| $A_2$ | 15 | — | 10 | 30 | 66 | — | 15 | — |
| $B_2$ | 69 | 84 | 56 | 36 | — | 66 | 51 | 66 |
| $D_1$ | 16 | 16 | — | — | — | — | — | — |
| $D_2$ | — | — | 28 | 28 | 28 | 28 | 34 | 34 |
| E | — | — | 6 | 6 | 6 | 6 | — | — |
| Total penetration energy [Nm] | 19 | 2 | 64 | 60 | 68 | 1.8 | 29 | 1.6 |
| Notched impact strength [kJ/m$^2$] | 4.3 | 2.6 | 4.1 | 6.3 | 12.4 | 1.7 | 3.2 | 2.1 |

V7 to V12: Comparative Experiments

The novel molding materials have a higher total penetration energy and an improved notched impact strength.

We claim:

1. A molding material based on polyarylene ethers A having terminal anhydride groups having the structure

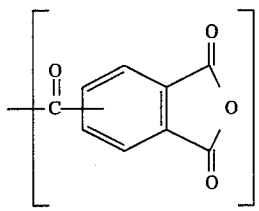

and repeating units I

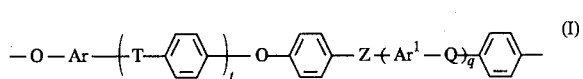

in which t and q may each be an integer 0, 1, 2 or 3, T and Q and Z may each be a chemical bond or a group selected from —O—, —S—, $OS_2$, S=O, C=O, —N=N—, —R$^a$C=CR$^b$— and —CR$^c$R$^d$—, with the proviso that the polymer backbone contains at least one of the groups —SO$_2$— or C=O; and Z cannot be —O— when t and q are each 0, R$^a$ and R$^b$ are each hydrogen or C$_1$–C$_{10}$-alkyl, R$^c$ and R$^d$ are each hydrogen or a C$_1$–C$_{10}$-alkyl, C$_1$–C$_{10}$-alkoxy or C$_6$–C$_{18}$-aryl group, where the abovementioned groups may each be substituted by fluorine or chlorine and Ar and Ar$^1$ are each C$_6$–C$_{18}$-aryl which may have substituents selected from the group consisting of C$_1$–C$_{10}$-alkyl, C$_6$–C$_{18}$-aryl, C$_1$–C$_{10}$-alkoxy and halogen, or random copolymers or block copolymers thereof.

2. A molding material as defined in claim 1, based on polyarylene ethers A containing from 5 to 95 mol % of repeating units $I_1$

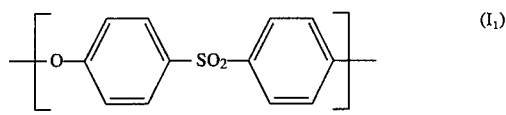

and from 5 to 95 mol % of repeating units $I_2$

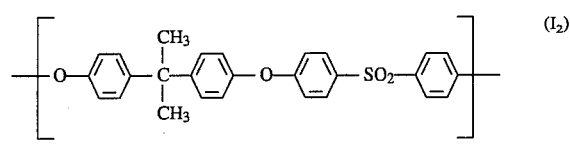

3. A molding material as defined in claim 1, obtained by reacting polyarylene ethers having terminal hydroxyl groups and repeating units I with anhydride compounds of the formula II

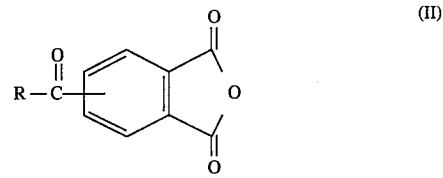

where R is Cl, Br, C$_1$–C$_{10}$-alkoxy or C$_6$–C$_{10}$-aryloxy.

4. A molding material as defined in claim 3, wherein trimellitic anhydride chloride (II$_1$) or trimellitic anhydride n-butyl ester (II$_2$)

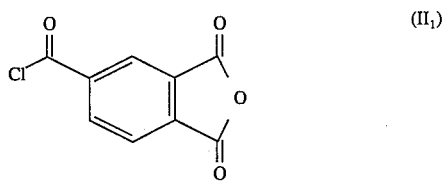

or

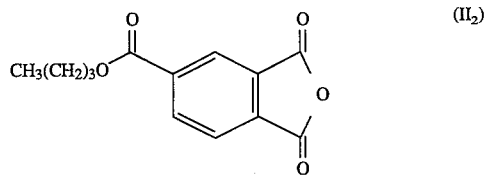

is used as the anhydride compound.

5. A process for the preparation of a molding material as defined in claim 1 which comprises: reacting a polyarylene ether having repeating units of the formula I with an anhydride compound of the formula II

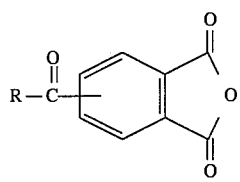
(II)
where R is Cl, Br, $C_1$–$C_{10}$-alkoxy or $C_6$–$C_{10}$-aryloxy.
6. A heat-stable adhesive based on a molding material as defined in claim 1 as an essential component.
* * * * *